United States Patent [19]
Beesley

[11] Patent Number: 5,862,482
[45] Date of Patent: Jan. 19, 1999

[54] TELECOMMUNICATIONS SYSTEM

[75] Inventor: Graham Edgar Beesley, Winchester, United Kingdom

[73] Assignee: Lucent Techonolgies Wireless Limited, Winchester, United Kingdom

[21] Appl. No.: 713,482

[22] Filed: Sep. 13, 1996

[30] Foreign Application Priority Data

Sep. 14, 1995 [GB] United Kingdom .................... 9518805

[51] Int. Cl.[6] ................................ H04Q 7/22; H04Q 7/32
[52] U.S. Cl. ........................... 455/434; 455/435; 455/550
[58] Field of Search .................................. 455/434, 435, 455/32.1, 515, 550

[56] References Cited

U.S. PATENT DOCUMENTS 4,972,355  11/1990  Mullins ................................. 455/435
5,519,757  5/1996  Torin ................................... 455/550

*Primary Examiner*—Andrew M. Dolinar
*Attorney, Agent, or Firm*—Wenderoth, Lind & Ponack, L.L.P.

[57] ABSTRACT

A telecommunications system having at least one base unit and a plurality of portable units is arranged to enable automatic re-registration of a portable unit with the system. The portable unit includes system and unit identity detectors and a registration sequence generator. The registration sequence generator is connected to a timer which monitors the elapse of time since a signal from a base unit of the system intended for the portable unit is received. The registration sequence generator generates a re-registration request in the event the monitored elapse of time is greater than a predetermined period and a signal from a base unit of the system is received which is not intended for the portable unit. With the system described portable units can automatically re-register with the system after being out of range of a base unit without the need for a separate beacon signal.

15 Claims, 1 Drawing Sheet

TELECOMMUNICATIONS SYSTEM

BACKGROUND OF INVENTION

The present invention relates to a telecommunications system and particularly but not exclusively to a digital time-division duplex radio communications system with a plurality of portable units or handsets and two or more base units forming a cordless telephone system.

Conventionally with a telecommunications system such as a CT2 wireless system which has many handsets and many base units each covering a respective cell in which one or more of the handsets may be found, the location of each of the handsets is monitored by repeated polling of the handsets at regular intervals. In this way incoming calls may be directed quickly to the correct base unit for communicating with the handset for which the call is intended. In this way the inefficiencies of multiple cell broadcast or of a handset search may be avoided. However, when the handset has been turned off or has moved out of range of the base units, typically the system searches for the handset for a given length of time and then either ceases to perform any searching for the handset or performs relatively infrequent searches. In situations such as this an incoming call would either be notified that the handset is unavailable or the call would be redirected for example to a voice mail facility.

Where continued but infrequent searches are performed by the system for the missing handset, when the handset re-enters the range of the system in due course the handset is polled in the usual manner and the usual procedure is followed enabling the handset to re-register its location. The disadvantage of this is that the handset could be within range of the system for some considerable time before it is polled and so calls may unwittingly be re-directed unnecessarily. In systems where all searching for the handset ceases after a predetermined period of time, it is necessary for the handset to be re-registered with the system before it can receive calls again. Such re-registration is usually performed either manually by the user of the handset or automatically by the handset in response to a special beacon transmission. Each procedure has disadvantages. In the case of manual re-registration the user may be unaware that the handset had been moved out of range and that re-registration is therefore necessary; where the handset performs re-registration automatically the system must reserve some of its traffic capacity for beacon purposes which is a considerable overhead where conventional tracking of the handsets is also performed.

SUMMARY OF THE INVENTION

The present invention seeks to overcome the disadvantages described above with conventional telecommunications systems and provides a system which enables substantially immediate automatic re-registration of a handset without a separate beacon facility and which is compatible with established telecommunications systems which employ tracking of the individual handsets.

The present invention provides a portable unit for use in a telecommunications system having one or more system base units. The portable unit includes signal means for receiving and transmitting radio signals; a system identification device connected to the signal means for determining whether a received signal is a valid signal transmitted by one of the system base units; a recipient identification device connected to the signal means for determining whether the received signal is intended for the portable unit; a timing device connected to the recipient identification device for monitoring the time elapsed since a signal intended for the portable unit was received; and an automatic registration request generator connected to the timing device for generating a registration request when a received signal is a valid signal not intended for the portable unit and the time elapsed is greater than a predetermined period.

With the present invention the portable unit is capable of automatically issuing a re-registration request when there has been no contact with a system base unit for some time and the portable unit is within range of a system base unit. As the portable unit monitors for valid signals not intended for the unit no separate beacon transmission is required to enable re-registration.

Preferably, the timing device is in the form of a counter which is reset to zero each time a valid signal intended for the portable unit is received. Also, the recipient identification device may be indirectly connected to the signal means via the system identification device so that only valid signals are checked to determine whether the received signal is intended for the portable unit. The automatic registration request generator may include gate means so that the generator is only enabled when the time elapsed is greater than the predetermined time and a valid signal not intended for the portable unit is received. The predetermined time may be selected so as to be greater than the time between sequential polling contact between a system base unit and the portable unit.

The present invention further provides a telecommunications system for transmitting and receiving radio signals between one or more portable units and at least one system base unit. Each of the portable units includes signal means for receiving and transmitting radio signals; a system identification device connected to the signal means for determining whether a received signal is a valid signal transmitted by one of the system base units; a recipient identification device connected to the signal means for determining whether the received signal is intended for the portable unit; a timing device connected to the recipient identification device for monitoring the time elapsed since a signal intended for the portable unit was received; and an automatic registration request generator connected to the timing device for generating a registration request when a received signal is a valid signal not intended for the portable unit and the time elapsed is greater than a predetermined period.

A further aspect of the present invention provides a method of automatic registration of a portable unit in a telecommunications system. The method includes monitoring radio signals received by the portable unit; determining whether a received signal is a valid signal from a base unit of the telecommunications system; determining whether the received signal is intended for the portable unit; monitoring an elapse of time since receipt of the last valid signal intended for the portable unit and determining whether the time lapse is greater than a predetermined period; and generating an automatic registration request when a valid signal not intended for the portable unit is received and the elapsed time is greater than the predetermined period.

Figure 1:
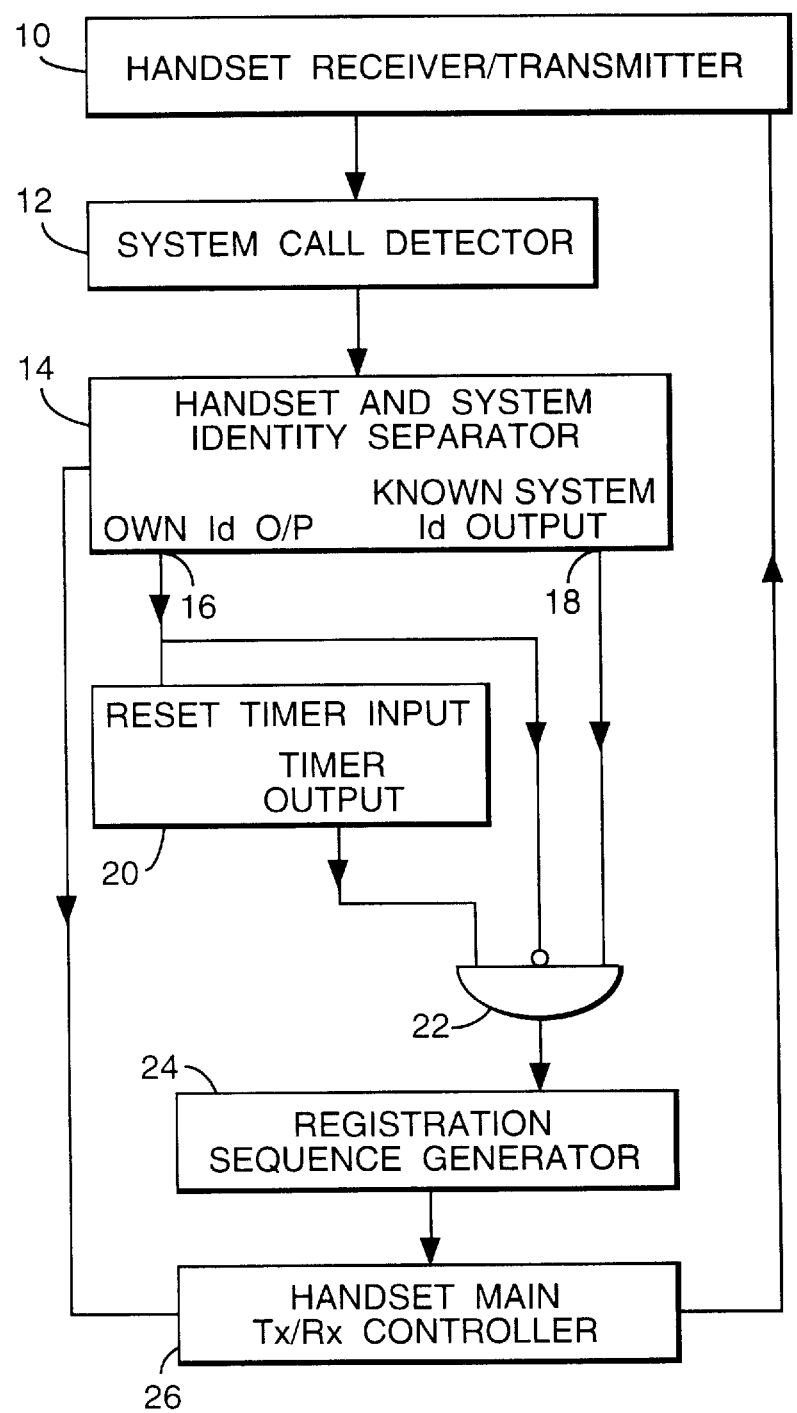
FIG. 1 shows schematically an automatic re-registration device in accordance with the present invention.

An embodiment of the present invention will now be described by way of example with reference to the accompanying drawing, FIG. 1, which shows schematically an automatic re-registration device in accordance with the present invention.

The re-registration system shown in the accompanying drawing is intended to form part of a handset and includes a receiver/transmitter 10 connected to a system call detector 12. The system call detector 12 determines whether a signal received by the receiver 10 is a signal generated by the system and transmitted by one of the base units in the system. To identify the origin of the signal the detector 12 includes conventional means for recognizing the identification codes of the base units in the system. The detector 12 is in turn connected to a signal separator 14 which determines whether the signal received is intended for the handset. The separator 14 includes conventional means for recognition of the unique ID code of the handset concerned. Where the separator 14 recognizes the presence of the handset's own ID in the signal received the signal will be either a polling signal or an incoming call. In either case an appropriate response is transmitted by the handset in the usual manner.

It will be apparent that the features of the re-registration system described above are established features of most conventional handsets, however, the operation of these features is adapted in the re-registration system in the following manner. The separator 14 includes a first output 16 and a second output 18. A signal is generated at the first output 16 when the separator 14 recognizes the presence of the handset's own ID code in the signal which was received. A signal is generated at the second output 18 when the signal received does not include the ID code for the handset and is not therefore a signal intended for the handset. The first output 16 is connected to a timer device 20, which may be in the form of a counter, and to a first port of an AND gate 22 which is an inverted port. The AND gate 22 is also connected via a second port to the output of the timer 20 and via a third port to the second output 18 of the separator 14. The output of the AND gate 22 is in turn connected to a registration sequence generator 24 which is connected to the main controller 26 of the handset.

Where the signal received is intended for the handset and is either an incoming call or a polling signal, the signal generated at the first output 16 of the separator 14 resets the timer device 20 to zero and causes the first inverted port of the AND gate 22 to be held low. If a further signal to the handset is not received within a predetermined time period which is set in the timer 20, the timer outputs a signal to the second of the ports of the AND gate 22. The predetermined time period is set so as to be greater than the usual time interval for standard polling of the handset, for example 2 minutes. This means that if the handset is registered with the system and is being polled in the usual manner the timer will be repeatedly reset to zero within the predetermined time period and the second of the ports of the AND gate 22 will be held low.

Where a signal is received from the system which the separator 14 identifies as a signal not intended for the handset (the signal may be for a different handset in the system for example), a signal is generated at the second output 18 of the separator 14 and is fed to the third port of the AND gate 22. At the same time the first output 16 of the separator is held low which generates a high signal at the first port of the AND gate 22. Once the predetermined time period of the timer device has elapsed, without any further signals being received which are intended for the handset, all of the ports to the AND gate 22 are high which enables the registration sequence generator 24.

When the registration sequence generator 24 is enabled it generates an unsolicited re-registration request which is transmitted by the receiver/transmitter 10 of the handset. On receipt of such a re-registration request the system identifies the handset and its cell location and re-establishes normal polling of the handset. The system therefore responds to the re-registration request in the same way as with manual registration. The re-registration request is preferably transmitted on the least active channel available. The re-registration system therefore monitors for channel transmissions in the system and uses the detection of such transmissions irrespective of whether the transmission was intended for the handset to confirm that the handset is in range of one or more of the base units and in the absence of regular polling of the handset by the system automatic re-registration is initiated.

It will be apparent from the above that the handset is the activator for the re-registration process unlike established systems which employ a special beacon transmission. The advantage of this system is that the handset is able to identify when there has been a break in communication with the system and is able to relocate itself for incoming calls without involving the user. Also the re-registration system is compatible with established telecommunications systems which employ regular polling of the handsets without the need for a separate beacon transmission. Handsets which do not include the re-registration system and so must be manually registered may be used in the same telecommunications system which makes the system very flexible in its operation and permits phased system evolution and upgrading.

Alternative arrangements of the re-registration system are envisaged which would enable the same automatic re-registration to be performed. The system described above is considered particularly convenient as it employs many devices already present in conventional handsets.

I claim:

1. A portable unit for use in a telecommunications system having one or more system base units, said portable unit comprising:

a signal receiving and transmitting device for receiving and transmitting radio signals;

a system identification device connected to said signal receiving and transmitting device for determining whether a received signal is a valid signal transmitted by one of the base units of the telecommunications system;

a recipient identification device for determining whether the received signal is intended for said portable unit;

a timing device connected to said recipient identification device for monitoring a time lapse since a signal intended for said portable unit was received; and an automatic registration request generator connected to said timing device for generating a registration request when a received signal is a valid signal not intended for said portable unit and the time lapse is greater than a predetermined period.

2. A portable unit as claimed in claim 1, wherein said signal receiving and transmitting device includes an output, said recipient identification device includes an input, and said system identification device is connected between said output of said signal receiving and transmitting device and said input of said recipient identification device.

3. A portable unit as claimed in claim 2, wherein said recipient identification device is an identity recognition and signal separator having at least two output signals including a first output signal for indicating a received signal is intended for the portable unit and a second output signal for indicating a received signal is not intended for the portable unit.

4. A portable unit as claimed in claim 3, wherein said timing device includes an output, said identity recognition and signal separator includes first and second outputs, and said automatic registration request generator includes gate means connected to said output of said timing device and said first and second outputs of said identity recognition and signal separator whereby said gate means is enabled when enabling signals are received from both said timing device and said second output of said identity recognition and signal separator.

5. A portable unit as claimed in claim 4, wherein said timing device is a counter having a reset connected to said first output of said identity recognition and signal separator.

6. A portable unit as claimed in claim 5, further comprising a channel monitoring device connected to said signal receiving and transmitting device for determining a least active channel.

7. A portable unit as claimed in claim 4, further comprising a channel monitoring device connected to said signal receiving and transmitting device for determining a least active channel.

8. A portable unit as claimed in claims 3, wherein said timing device is a counter having a reset connected to said first output of said identity recognition and signal separator.

9. A portable unit as claimed in claim 8, further comprising a channel monitoring device connected to said signal receiving and transmitting device for determining a least active channel.

10. A portable unit as claimed in claim 3, further comprising a channel monitoring device connected to said signal receiving and transmitting device for determining a least active channel.

11. A portable unit as claimed in claim 2, further comprising a channel monitoring device connected to said signal receiving and transmitting device for determining a least active channel.

12. A portable unit as claimed in claim 1, further comprising a channel monitoring device connected to said signal receiving and transmitting device for determining a least active channel.

13. A telecommunications system for transmitting and receiving radio signals between one or more portable units and at least one system base unit, each of said portable units comprising:

a signal receiving and transmitting device for receiving and transmitting radio signals;

a system identification device connected to said signal receiving and transmitting device for determining whether a received signal is a valid signal transmitted by one of the system base units;

a recipient identification device for determining whether the received signal is intended for a respective said portable unit;

a timing device connected to said recipient identification device for monitoring a time lapse since a signal intended for the respective said portable unit was received; and an automatic registration request generator connected to said timing device for generating a registration request when a received signal is a valid signal not intended for the respective said portable unit and the time lapse is greater than a predetermined period.

14. A method of automatic registration of a portable unit in a telecommunications system comprising:

monitoring radio signals received by the portable unit;

determining whether a received signal is a valid signal from a base unit of the telecommunications system;

determining whether the received signal is intended for the portable unit;

monitoring a time lapse since receipt of the last valid signal intended for the portable unit and determining whether the time lapse is greater than a predetermined period; and generating an automatic registration request when a valid signal not intended for the portable unit is received and the time lapse is greater than the predetermined period.

15. A method as claimed in claim 14, wherein said determining comprises determining whether the time lapse is greater than a predetermined period which is greater than the time interval between sequential polling contact between a system base unit and the portable unit.

* * * * *